Patented Apr. 25, 1950

2,505,457

UNITED STATES PATENT OFFICE 2,505,457

METHOD OF INHIBITING SCALE

Paul G. Bird, Western Springs, Ill., assignor to National Aluminate Corporation, Chicago, Ill., a corporation of Delaware No Drawing. Application June 19, 1947, Serial No. 755,717

6 Claims. (Cl. 210—23)

This invention relates to the prevention or inhibiting of scale in evaporators, feed water heaters, economizers, boilers and other steam generating systems. More specifically, it relates to the prevention of phosphate scale in steam generators operating at high pressures and the corresponding temperatures by incorporating in the feed water going to the evaporator boiler, or the like, a water soluble organic material prepared by the treatment of lignosulfonate under certain conditions of temperature, pressure and time, as more fully described hereinafter.

It is known that certain organic compounds, when added to the feed water going to a boiler, evaporator, or other types of equipment in which the water is to be heated, and which contains scale forming salts such as calcium and magnesium compounds, will reduce the amount of scale which forms on the heating surfaces of the equipment. Among the common organic compounds used for such purposes are various natural tannin extracts such as chestnut, cutch, quebracho, etc. Another organic material in use is the sodium salt of lignin sulfonic acid obtained from the waste liquors from sulfite pulp manufacture.

There are two predominant types of scale encountered in the operation of boilers, evaporators, and other steam generators, depending on the mode of treatment of the feed water. Where the feed water is to be heated under low pressures, i. e., up to approximately 350 p. s. i. sodium carbonate is generally used as a component of the treatments and the resulting deposits or scale tend to be predominantly calcium carbonate. Where the feed water is to be heated under higher pressures, i. e., above about 350 p. s. i., the alkali phosphates are generally used and the resulting scale or deposit tends to be primarily calcium phosphate or hydroxy apatite.

The previously described organic materials are effective in varying degrees in preventing calcium carbonate scale but are substantially ineffective in preventing or inhibiting calcium phosphate scale which occurs in steam generators operating under high pressures and temperatures.

One of the objects of the present invention is to provide a new and improved method of preventing or inhibiting calcium phosphate scale in steam generators operating under high pressure and temperature conditions. Other objects will appear hereinafter.

In accordance with the invention it has been found that certain lignin derivatives prepared by heating sodium lignosulfonate, such as that obtained from the sulfite pulp process, in the presence of an excess of caustic soda at a temperature within the range of 265 degrees C. to 325 degrees C. under superatmospheric pressure for a period of 30 to 120 minutes are particularly effective in preventing calcium phosphate scale in high pressure steam generators. The compositions used for the purpose of the invention may be described as de-methylated lignin compounds.

The preferred compositions employed for the purpose of the invention are obtained by the controlled alkaline hydrolysis of an aqueous mixture containing by weight 250 to 350 grams per liter of sodium lignosulfonate substantially free from calcium and magnesium ions, and 50 to 100 grams per liter of caustic soda, the hydrolysis being effected by heating said mixture under superatmospheric pressures, e. g., 1500 pounds per square inch, sufficient to maintain the liquid phase, at temperatures from 265 degrees C. to 325 degrees C. for a period of 30 to 120 minutes.

A preferred type of composition for the purpose of the invention is a water soluble de-methylated lignin compound resulting from the alkaline hydrolysis of an aqueous mixture containing by weight 250 to 350 grams per liter of sodium lignosulfonate substantially free from calcium and magnesium ions and derived from waste sulfite liquor, hydrolyzed with 50 to 100 grams per liter of caustic soda at a temperature of about 285 degrees C. and a pressure of 1500 pounds per square inch for 30 minutes, followed by partial neutralization of the excess caustic soda present and drying.

In practicing the invention, the above described compositions may be added directly to a boiler without first incorporating them into the feed water, but it is usually preferable to incorporate the compositions into the boiler water by adding them to the feed water, with or without the addition of other water treating chemicals. This may be accomplished by preparing the scale preventing compositions in the form of briquettes which may also contain phosphates or other materials to be added to the water for specific purposes. When these products are used in a feed water carrying a low caustic soda content and a low salt content, the neutralizing acid used to neutralize or partially neutralize the alkaline hydrolysis product may be phosphoric acid, thus making it possible to introduce the organic scale preventing material and the soluble phosphate at the same time without further processing or compounding of the product.

In general, the quantity of the de-methylated lignin compound employed for the purpose of the invention at high pressures where the phosphate type of treatment is employed, and where the feed waters entering the boiler contain not more than about a grain per gallon of hardness (as calcium carbonate) will be of the order of 0.5 to 8 parts per million (P. P. M.).

An alkali such as, for example, caustic soda, sodium carbonate or an alkaline phosphate is generally required to adjust the boiler water to the desired point of alkalinity or pH. In the practice of the present invention the liquor resulting from the alkaline hydrolysis as previously described can be used directly without neutralizing or drying, thereby taking advantage of the excess caustic when that is desirable. This also results in a saving in drying costs.

As stated above, it is often preferred to prepare the product in a dry form so that in use it may be mixed with other water treating chemicals and employed in a pulverized or briquetted form. To facilitate drying and to reduce the affinity of the product for oxygen and moisture, it is usually preferable to at least partially neutralize the final cook liquors to a pH of 8 to 10.5 by the use of sulfuric acid, carbon dioxide, or other acid.

These de-methylated lignin compounds possess the inherent property of reacting readily with oxygen, especially if sufficient moisture is present, and this may occur to such an extent that the powdered material heats spontaneously to a temperature approaching its ignition point. In order to reduce this hazard and minimize the tendency to absorb oxygen, it is preferable to reduce the pH of the liquors to about 9 before drying. At this pH some of the phenolic materials present are rendered insoluble but these readily redissolve if the pH is increased to 10–10.5 by the use of caustic, soda ash, and the like when dissolving the product.

Where the liquor is dried to a powder before use it is usually desirable, as previously indicated, to prepare the powder in the form of a briquette, either alone or in combination with other water treating chemicals such as soda ash, alkali orthophosphates, acid phosphates, alkali polyphosphates, and/or tannins.

It will be understood that the term "phosphate" as used herein is employed in a generic sense to cover orthophosphates, for example, monosodiumphosphate, disodiumphosphate and trisodiumphosphate, or any other phosphate, or compound decomposing to a phosphate, which has a tendency to form a phosphate scale.

The expression "high pressure steam generation" as used herein refers to steam generation at pressures in excess of about 350 pounds per square inch and the corresponding temperatures.

Having thus described the invention, what I claim as new and desire to secure by Letters Patent of the United States is:

1. In the generation of steam, the process of inhibiting scale which comprises incorporating with the water from which the steam is generated a scale inhibiting composition soluble in alkaline solutions at a pH of 10.5 and resulting from the alkaline hydrolysis of sodium lignosulfonate with a caustic alkali at temperatures within the range of 265 degrees C. to 325 degrees C. for a period of 30 to 120 minutes under superatmospheric pressures.

2. In the generation of steam, the method which comprises generating steam from water containing a phosphate under conditions wherein scale would normally tend to form and inhibiting the scale formation by incorporating with the water from which the steam is generated a scale inhibiting composition soluble in alkaline solutions at a pH of 10.5 and resulting from the alkaline hydrolysis of sodium lignosulfonate with a caustic alkali at temperatures within the range of 265 degrees C. to 325 degrees C. for a period of 30 to 120 minutes under superatmospheric pressures.

3. The process of inhibiting scale formation in high pressure steam generation wherein a phosphate is present and phosphate scale has a tendency to form which comprises incorporating with the boiler water a lignin product soluble in aqueous alkaline solution at a pH of about 10.5 and resulting from the alkaline hydrolysis of sodium lignosulfonate with a caustic alkali within a temperature range of 265 degrees C. to 325 degrees C. for a period of 30 to 120 minutes under superatmospheric pressures.

4. In the generation of steam, the method which comprises generating steam from a water having not more than about a grain per gallon of hardness and containing a phosphate under high pressure steam generating conditions wherein a phosphate scale would normally tend to form and inhibiting said scale formation by incorporating with said water about 0.5 to 8 parts per million of a composition soluble in aqueous alkaline solution at a pH of about 10.5 and resulting from the alkaline hydrolysis of sodium lignosulfonate with a caustic alkali within a temperature range of 265 degrees C. to 325 degrees C. for a period of 30 to 120 minutes under superatmospheric pressures.

5. In the generation of steam, the process of inhibiting scale which comprises incorporating with the water from which the steam is generated a scale inhibiting composition resulting from the alkaline hydrolysis of an aqueous mixture derived from waste sulfite liquor containing by weight 250 to 350 grams per liter of sodium lignosulfonate substantially free from calcium and magnesium ions, and 50 to 100 grams per liter of caustic soda hydrolyzed under superatmospheric pressures sufficient to maintain the liquid phase at temperatures within the range from 265 degrees C. to 325 degrees C. for a period of 30 to 120 minutes.

6. In the generation of steam, the process of inhibiting scale which comprises incorporating with the water from which the steam is generated a scale inhibiting composition resulting from the alkaline hydrolysis of an aqueous mixture derived from waste sulfite liquor, and containing by weight 250 to 350 grams per liter of sodium lignosulfonate substantially free from calcium and magnesium ions, and 50 to 100 grams per liter of caustic soda, heated and hydrolyzed under superatmospheric pressures of about 1500 pounds per square inch and at a temperature of about 285 degrees C. for a period of about 30 minutes.

PAUL G. BIRD.

REFERENCES CITED

The following references are of record in the file of this patent:

UNITED STATES PATENTS

| Number | Name | Date |
|---|---|---|
| 2,200,784 | Wallace | May 14, 1940 |
| 2,297,670 | Schroeber et al. | Sept. 29, 1942 |
| 2,318,663 | Bird et al. | May 11, 1943 |

FOREIGN PATENTS

| Number | Country | Date |
|---|---|---|
| 832,224 | France | June 27, 1938 |